United States Patent
Carey

(10) Patent No.: US 9,067,186 B2
(45) Date of Patent: Jun. 30, 2015

(54) STABILITY CONTROL OF A HYDROGEN GENERATING SYSTEM AND METHOD

(75) Inventor: Jeff Carey, Oakland, CA (US)

(73) Assignee: MARINE POWER PRODUCTS INCORPORATED, Oakland, CA (US)

( * ) Notice: Subject to any disclaimer, the term of this patent is extended or adjusted under 35 U.S.C. 154(b) by 0 days.

(21) Appl. No.: 13/366,216

(22) Filed: Feb. 3, 2012

(65) Prior Publication Data

US 2012/0132535 A1 May 31, 2012

Related U.S. Application Data

(63) Continuation-in-part of application No. 12/706,639, filed on Feb. 16, 2010.

(60) Provisional application No. 61/154,282, filed on Feb. 20, 2009, provisional application No. 61/441,193, filed on Feb. 9, 2011.

(51) Int. Cl.
*C25B 1/02* (2006.01)
*C25B 15/08* (2006.01)
*C25B 15/00* (2006.01)
*C25B 9/00* (2006.01)
*B01J 7/02* (2006.01)
*B01J 23/89* (2006.01)
*C01B 3/04* (2006.01)
(Continued)

(52) U.S. Cl.
CPC . *B01J 7/02* (2013.01); *C25B 15/08* (2013.01); *B01J 23/8926* (2013.01); *B01J 2219/00006* (2013.01); *B01J 2219/00144* (2013.01); *C01B 3/04* (2013.01); *C01B 13/0203* (2013.01); *C25B 1/04* (2013.01); *C25B 15/02* (2013.01); *Y02E 60/364* (2013.01); *Y02E 60/366* (2013.01)

(58) Field of Classification Search
CPC .................... C25B 1/02–1/12; C25B 15/08
USPC .................................. 205/628–639
See application file for complete search history.

(56) References Cited

U.S. PATENT DOCUMENTS

| 4,004,067 A | 1/1977 | Briggs et al. |
| 4,144,147 A | 3/1979 | Jarrett et al. |

(Continued)

FOREIGN PATENT DOCUMENTS

| EP | 1249052 B1 | 4/2009 |
| WO | 8910981 | 11/1989 |

(Continued)

OTHER PUBLICATIONS http://www.wgpeters.com/colloidal-silver-chemistry/ posted May 8, 2010.*

(Continued)

*Primary Examiner* — Nicholas A Smith
*Assistant Examiner* — Brian W Cohen
(74) *Attorney, Agent, or Firm* — Haverstock & Owens LLP

(57) ABSTRACT

A method of and apparatus for efficient on-demand production of $H_2$ and $O_2$ from water and heat using environmentally safe metals are disclosed. In one aspect, the apparatus for hydrogen generation through water-decomposition reaction includes a main reactor, an oxidizer reactor, and a computer-control system. The computer system is configured to control each of the components of the hydrogen gas production system for stable hydrogen-gas production.

26 Claims, 10 Drawing Sheets

(51) Int. Cl.
*C01B 13/02* (2006.01)
*C25B 1/04* (2006.01)
*C25B 15/02* (2006.01)

(56) References Cited

U.S. PATENT DOCUMENTS

| | | | |
|---|---|---|---|
| 4,358,291 | A | 11/1982 | Cuomo et al. |
| 4,394,293 | A | 7/1983 | Gratzel et al. |
| 4,454,427 | A | 6/1984 | Sosnowski et al. |
| 5,219,671 | A | 6/1993 | Parker et al. |
| 6,306,917 | B1 | 10/2001 | Bohn et al. |
| 7,125,480 | B2 | 10/2006 | Austin |
| 7,252,806 | B1 | 8/2007 | Merritt |
| 6,843,903 | B2 | 1/2008 | Roe et al. |
| 7,875,166 | B2 | 1/2011 | Matthai et al. |
| 7,989,507 | B2 | 8/2011 | Rising |
| 2001/0046113 | A1 | 11/2001 | Schmidt |
| 2002/0048548 | A1 | 4/2002 | Chaklader |
| 2004/0265678 | A1 | 12/2004 | Hommura et al. |
| 2005/0051439 | A1 | 3/2005 | Jang |
| 2006/0102468 | A1 | 5/2006 | Monzyk et al. |
| 2006/0118428 | A1 | 6/2006 | Baltrucki et al. |
| 2006/0180464 | A1 | 8/2006 | Griffin |
| 2006/0188436 | A1 | 8/2006 | Griffin |
| 2006/0249393 | A1* | 11/2006 | Ghosh et al. ......... 205/639 |
| 2007/0072949 | A1 | 3/2007 | Ruud et al. |
| 2007/0244208 | A1 | 10/2007 | Shulenberger et al. |
| 2009/0074611 | A1 | 3/2009 | Monzyk et al. |
| 2009/0101520 | A1 | 4/2009 | Zhang et al. |
| 2009/0110976 | A1 | 4/2009 | Yoshida et al. |
| 2009/0152126 | A1 | 6/2009 | Griffin |
| 2009/0277799 | A1 | 11/2009 | Grimes et al. |
| 2010/0000874 | A1 | 1/2010 | Hinman et al. |
| 2010/0133111 | A1 | 6/2010 | Nocera et al. |
| 2010/0224502 | A1 | 9/2010 | Carey |
| 2011/0114075 | A1 | 5/2011 | Mills |

FOREIGN PATENT DOCUMENTS

| | | |
|---|---|---|
| WO | 2010084358 A2 | 7/2010 |
| WO | 2011002527 A1 | 1/2011 |
| WO | 2012062529 A1 | 5/2012 |

OTHER PUBLICATIONS

Currao et al., Water Splitting with Silver Chloride Photoanodes and Amorphous Silicon solar Cells. Photochemical and Photobiological Sciences, vol. 3, 2004, [retrieved on Nov. 19, 2013], Retrieved from the Internet. <URL: http://www.gioncalzaferri.ch/publikationen/Photochem_Photobiol_Sci_2004_3_1017%20Watersplitting.pdf>.entire document.

Hydrogen Production—Wikepedia, the free encyclopedia, pp. 4-7, http://en.wikipedia.org/wiki/Hydrogen_production, Dec. 12, 2008.

Venere,Emil, "New Process Generates Hydrogen From Aluminum Alloy to Run Engines, Fuel Cells", Purdue University, http://news.uns.purdue.edu/x/2007a/070515WoodallHydrogen.html, May 15, 2007.

Perret, Robert, "II.F.1 Develpment of Solar-Powered Thermochemical Production of Hydrogen from Water", DOE Hydrogen Program, FY 2007 Annual Progress Report, pp. 128-135.

Kim, MingJoong et al., "Hydrogen generation from hydrolysis reaction through corrosion of Al—Cu alloy in alkaline water", Dep. of Materail Science and Engineering, Oct. 5, 2009.

"Bayer process", hhttp://en.wikipedia.org/wiki/Bayer_proces, pp. 1-2, Dec. 13, 2007.

Soler, Lluis et al., "Aluminum and aluminum alloys as sources of hydrogen for fuel cell applications", Journal of Power Sources,2007, www.sciencedirect.com, www.elsevier.com/locate/jpowsour, pp. 144-149.

* cited by examiner $4Al(OH)_3 + 4H_2O \rightleftharpoons 4[Al(OH)_4]^- + 4H^+$   Eq. 802

$4AgCu(OH)_2 + 4[Al(OH)_4]^- + 4H^+ \rightleftharpoons 4Cu(OH)_2 + 4AgOH + 4Al(OH)_3 + 2H_2$   Eq. 804

$4AgOH \rightleftharpoons 2Ag_2O + 2H_2O$   Eq. 806

$2Ag_2O \underset{\Delta}{\overset{h\nu}{\rightleftharpoons}} 4Ag + O_2$   Eq. 808

Fig. 8A

$2Ag + 2H_2O \rightleftharpoons 2OH^- + 2Ag^+ + H_2$   Eq. 820

$2OH^- + 2Ag^+ \rightleftharpoons Ag_2O + H_2O$   Eq. 822

$Ag_2O \underset{\Delta}{\overset{h\nu}{\rightleftharpoons}} 2Ag + 1/2 O_2$   Eq. 824

Fig. 8B

STABILITY CONTROL OF A HYDROGEN GENERATING SYSTEM AND METHOD

CROSS-REFERENCE TO RELATED APPLICATIONS

This application is a continuation-in-part of U.S. patent application Ser. No. 12/706,639, filed Feb. 16, 2010, and entitled "Method and Apparatus for Efficient On-demand Production of $H_2$ And $O_2$ From Water Using Waste Heat and Environmentally Safe Metals", which claims priority from U.S. Provisional Patent Application Ser. No. 61/154,282, filed Feb. 20, 2009 and entitled "Method and Apparatus for Efficient On-demand Production of $H_2$ And $O_2$ From Water Using Environmentally Safe Metals", which are all hereby incorporated herein by reference in their entirety for all purposes.

Further, this application claims priority from U.S. Provisional Patent Application Ser. No. 61/441,193, filed Feb. 9, 2011 and entitled "Stability Control of a Hydrogen Generating System and Method," which is hereby incorporated herein by reference in its entirety for all purposes.

FIELD OF THE INVENTION

The present invention relates to the field of hydrogen and oxygen production. More specifically, the present invention relates to the field of on-demand hydrogen and oxygen production from water using heat, water, and environmentally safe catalysts.

BACKGROUND OF THE INVENTION

Hydrogen is commonly produced from hydrocarbon fossil fuels. One of the significant problems of using hydrocarbon fossil fuels to generate hydrogen is that the process generates carbon dioxide ($CO_2$), a greenhouse gas. An alternative source for hydrogen production is water. Currently available methods of generating hydrogen from water include biological hydrogen production, electrolysis of water, chemical production, and thermochemical production.

Some researchers report that Group IV transitional metals react with water and generate hydrogen gas and a metal hydroxide. However, the conversion rates of these metals cannot produce large volumes of hydrogen gas for efficient and practical use. Furthermore, there are no efficient methods or apparatuses available to recycle the metal hydroxides and convert the hydroxide into hydrogen and oxygen.

SUMMARY OF THE INVENTION

Methods and apparatuses for efficient on-demand production of $H_2$ and $O_2$ from water and heat and/or light using environmentally safe metals are disclosed. In one aspect, the apparatus for the hydrogen generation through water decomposition reaction includes a main reactor, an oxidizer reactor, and a computer-control system.

In some embodiments, the main reactor contains electrodes, reactants, catalysts, and solvents. A voltage is applied to the electrodes for assisting the hydrogen production. The reactants and catalysts of the system include a hydrogen-generating substance, water, and salts. The catalysts are able to be activated by the electrochemical methods. Hydrogen gas is generated with heat supplied in the main reactor. After or during the reaction, the solution in the main reactor flows to the oxidizer reactor for regeneration reactions. In some embodiments, the regeneration reaction liberates $O_2$ gas.

In some embodiments, the oxidizer reactor is configured for photolysis or thermolysis for an oxygen reaction. In some embodiments, the thermolysis is at a temperature above 32° C. and below 110° C. In some embodiments, the computer-control system controls the operation of the system and monitors the status of each reaction reactor and corresponding reaction conditions. The computer-control system contains software to control and monitor reaction conditions, such as pH values, temperature, salinity, applied voltage, catalyst formulation, purity and quantity of the gases generated, water level, color, solution level, and other proper factors.

In the following, some aspects of maintaining a stable electro-catalytic-hydrolysis system are provided. In an aspect, a method of maintaining the performance of a catalytro-catalytic-hydrolysis system comprises preparing the electric-catalytic-hydrolysis system comprising a solution containing a hydrogen generating catalyst, a light providing device and an electric energy providing device and optimizing hydrogen production by optimizing a reaction condition. In some embodiments, the hydrogen generating catalyst contains an aluminum ion, a copper ion, and a silver ion. In some embodiments, optimizing a reaction condition comprises maintaining the pH value below 8.5. In other embodiments, optimizing a reaction condition comprises maintaining the reactor core pH value between 7.5 and 8.5. In some other embodiments, optimizing a reaction condition comprises maintaining the pH value in a range capable of optimizing a hydrogen production rate. In some embodiments, optimizing a reaction condition comprises optimizing an amount of the hydrogen generating catalyst. In other embodiments, optimizing the amount of the hydrogen generating catalyst comprises increasing a regeneration rate of the hydrogen generating catalyst. In some other embodiments, the regeneration rate of the hydrogen generating catalyst comprises a rate of converting a reacted hydrogen generating catalyst back to the hydrogen generating catalyst. In some embodiments, optimizing a reaction condition comprises optimizing a regeneration rate of $Ag^0$. In other embodiments, optimizing a reaction condition comprises optimizing an amount of $Ag^0$, $Ag^{1+}$, or a combination thereof. In some other embodiments, optimizing a reaction condition comprises increasing the rate of dissociating oxygen from the silver ion. In some embodiments, optimizing a reaction condition comprises increasing the rate of dissociating a hydroxide from the silver ion. In other embodiments, optimizing a reaction condition comprises increasing the rate of dissociating a hydroxide from the copper ion. In some other embodiments, optimizing a reaction condition comprises optimizing a light providing amount through the light providing device. In some embodiments, optimizing a reaction condition comprises optimizing heat providing duration, a heat providing rate, a heat providing amount, or a combination thereof through a heat providing device. In other embodiments, optimizing a reaction condition comprises optimizing a voltage providing through the electric energy providing device.

In another aspect, a device for maintaining a performance of a system comprises an electro-catalytic-hydrolysis system comprising a solution containing a hydrogen generating catalyst, a light providing device and an electric energy providing device and a controller to control a reaction condition such that a hydrogen generation reaction is optimized. In some embodiments, the hydrogen generating catalyst contains an aluminum ion, a copper ion, and a silver ion. In some embodiments, controlling a reaction condition comprises maintaining the reactor core pH value below 9.7. In other embodiments, controlling a reaction condition comprises maintaining the pH value between 7.5 and 8.5. In some other embodiments, controlling a reaction condition comprises optimizing an amount of the hydrogen generating catalyst. In some embodiments, controlling a reaction condition comprises increasing a regeneration rate of the hydrogen generating catalyst. In other embodiments, the regeneration rate of the hydrogen generating catalyst comprises a rate of converting a reacted hydrogen generating catalyst back to the hydrogen generating catalyst. In some other embodiments, controlling a reaction condition comprises optimizing a regeneration rate of $Ag^0$. In some other embodiments, controlling a reaction condition comprises optimizing an amount of $Ag^0$, $Ag^{1+}$, or a combination thereof. In other embodiments, controlling a reaction condition comprises increasing the rate of dissociating oxygen from the silver ion. In some other embodiments, controlling a reaction condition comprises increasing the rate of dissociating a hydroxide from the silver ion. In some embodiments, controlling a reaction condition comprises increasing the rate of dissociating a hydroxide from the copper ion. In other embodiments, controlling a reaction condition comprises optimizing a light providing rate, a light providing amount, a light providing frequency, or a combination thereof through the light providing device. In some other embodiments, controlling a reaction condition comprises optimizing a heat providing rate, a heat providing amount, or a combination thereof through a heat providing device. In some embodiments, controlling a reaction condition comprises optimizing a voltage providing rate, a voltage providing amount, or a combination thereof through the electric energy providing device.

In a further aspect, a method of controlling an electric-catalytic-hydrolysis system comprises monitoring a reaction condition of the electric-catalytic-hydrolysis system and maintaining the reaction condition in a pre-determined range, such that a catalytic hydrogen production reaction is able to generate hydrogen continuously. In some embodiments, the reaction condition comprises a pH value, a temperature, a pressure, an illumination condition, a reactant amount, or a combination thereof. In some embodiments, the illumination condition comprises an intensity of illumination. In other embodiments, the illumination condition comprises a duration of illumination. In some other embodiments, the pH value at the oxidizer is between 8.5 and 10.5.

BRIEF DESCRIPTION OF THE DRAWINGS

FIG. 8a and FIG. 8b illustrate equations of a hydrogen production scheme in accordance with some embodiments.

DETAILED DESCRIPTION OF THE PREFERRED EMBODIMENT

Illustrative System

Figure 1:
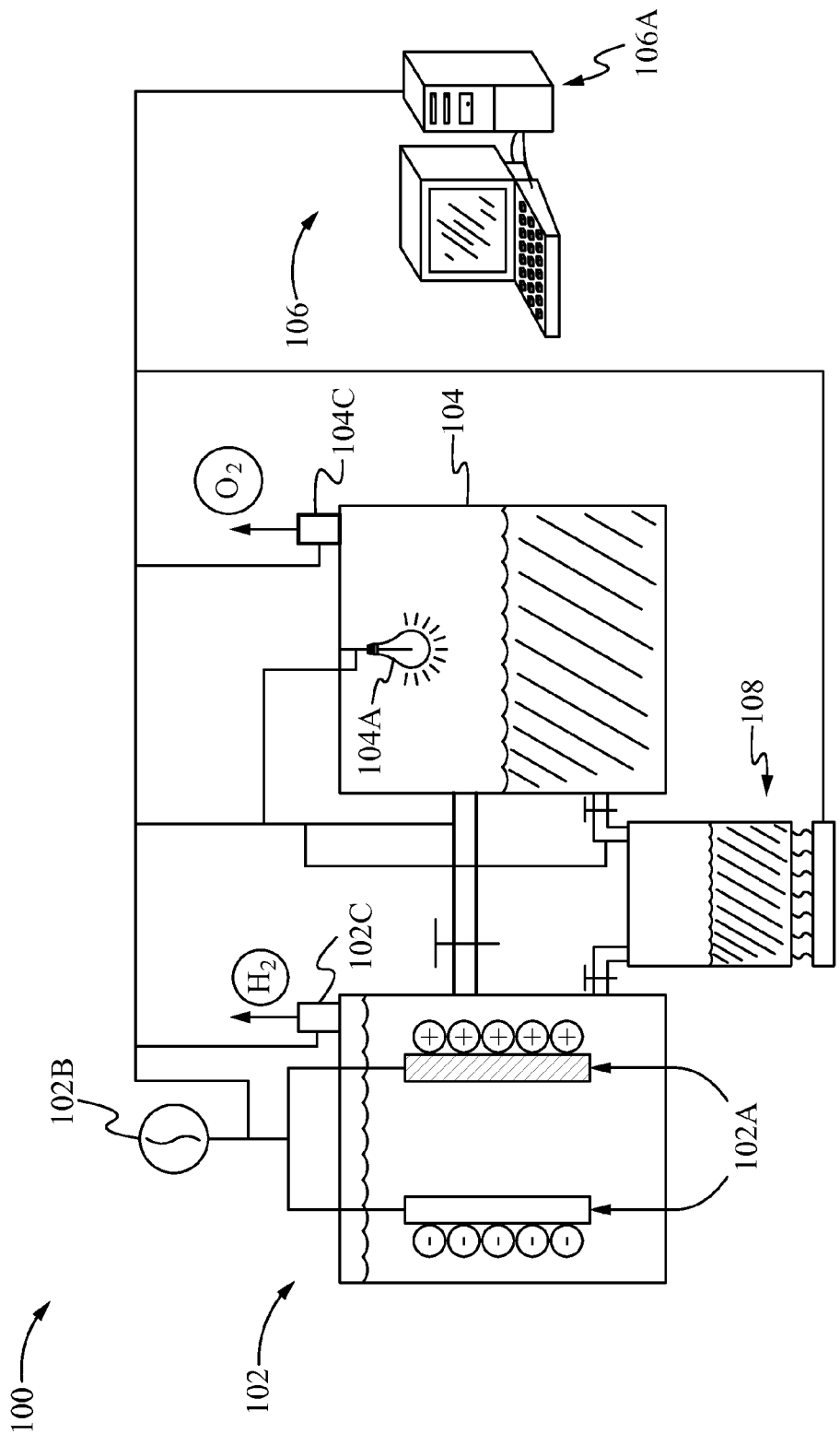
FIG. 1 illustrates the components of a system in accordance with some embodiments.

FIG. 1 illustrates a system 100 in accordance with some embodiments. In some embodiments, the apparatus for the hydrogen generation through water decomposition includes: a main reactor 102, an oxidizer reactor 104, a heat source 108, and a computer-control system 106. In some embodiments, the main reactor 102 is a chamber where hydrogen is generated. Further, the main reactor 102 contains electrodes 102A, reactants, catalysts, and solvents. The electrodes 102A contain iron, graphite, stainless steel, alloy, or any other proper materials. In some embodiments, the stainless steel includes Stainless 302, 316, 316L, 421. In some embodiments, the electrodes are metal alloy, such as Fe/Al or Fe/Cr/Mn and Fe/Si/Mn alloys. In some embodiments, the alloys have a Fe/Al mole or weight ratio of 97/3, 95/5, or 93/7. A voltage is applied to the electrodes 102A. In some embodiments, the voltage is generated by a power source 102B. In some embodiments, the voltage applied is between 0.8V and 3.0V. Alternatively, the voltage applied is about 5V or any voltage between 0.2V and 10.0V. In some embodiments, −2.5V or 0V is applied to a graphite electrode and +1.7V is applied to metal for 15 minutes, 1.4V is applied to copper metal for 10 minutes, and 1.0V is applied to silver metal for 5 minutes when ionizing the metals in the reaction solution. In alternative embodiments, −2.5V is applied to a graphite electrode and +2.5V is applied to aluminium, copper, and silver metals concurrently for about 30 minutes when ionizing the metals into the reaction solution. Further, in some embodiments, a voltage between −0.4V and −0.9V is applied to a stainless steel electrode (cathode) during the electric-hydrolysis reactions. It should be understood that the voltage range mentioned above is an example, and other possible voltages are able to be applied. The reactants and catalysts of the system include the hydrogen-generating substance, water, and salts.

In some embodiments, the hydrogen-generating substance contains a metal, a metal oxide, a metal hydroxide, or a metal derivative compound. Alternatively, the hydrogen-generating substance contains an Al atom, Al ion, an atom with an atomic number 13, or combinations thereof. Alternatively, the hydrogen-generating substance contains $[Al(OH)_4]^-$, $Al(OH)_3$, $[Al(OH)_2]^+$, $Al^{3+}$, or $[Al(OH)]^{2+}$. A person skilled in the art would appreciate that the hydrogen-generating substance is able to contain Group IA to VIIA elements, such as magnesium, calcium, silicon, cobalt, and gallium. In some alternative embodiments, the hydrogen-generating substance contains Group IB to VIIB elements, such as zinc, nickel, iron, and copper. Alternatively, the hydrogen-generating substance contains inner transitional elements. A person of ordinary skill in the art would appreciate that other suitable chemical elements, alloys, nanomaterials, polymers, and natural or synthetic compounds are able to be used. Further, a person skilled in the art would appreciate that the terms "bind," "binding," "bound," or functionally equivalent terms are examples of showing that two or more substances have interactions or forces between or among them. The present disclosure is not limited to actually binding, bonding, or forming chemical bonds.

In some embodiments, the water used has a salinity of about 1.5% by weight. Other suitable percentages of salinity are able to be used, such as sea water, which has salinity about 3.8%. The salts used are able to include NaCl (sodium chloride), $CaCl_2$ (calcium chloride), $Na_2CO_3$, or other suitable ion sources. The gases generated, such as hydrogen, are transferred through the pipe 102C. After or during the reaction, the solution in the main reactor 102 flows to the oxidizer reactor 104 for oxygen reactions.

In some embodiments, the oxidizer reactor 104 is configured for photolysis or thermolysis for the oxygen-liberation reactions. The light source 104A generates light for the photolysis reaction. A heat source (not shown in the figure) generates heat for thermolysis. In some embodiments, the temperature for the thermolysis reaction is less than 200° C. In other embodiments, the temperature for the thermolysis reaction is equal to or above 200° C. In some embodiments, the heat source transfers and/or collects environmental heat to be used by the system 100. The gases generated are transferred through the pipe 104C. A person skilled in the art would appreciate that other proper methods or apparatuses are able to be used for the oxygen reaction.

In some embodiments, the heat source for electro-catalytic-hydrolysis is able to be an independent heat exchanger 108. A person skilled in the art will also appreciate that the heat source is able to be installed in the main reactor 102 or in any other suitable chambers.

In some embodiments, the computer-controller 106 controls the operations of the system 100 and monitors the status of the reaction conditions in each of the reaction reactors. The computer-controller 106 contains a control software application 106A to control and monitor reaction conditions, such as pH value, temperature, salinity, applied voltage, purity and quantity of the gases generated, water level, catalyst formulation, catalyst reaction characteristics, and solution level in the main reactor 102 and the oxidizer reactor 104. A person skilled in the art would appreciate that the computer-controller 106 is able to be used for other purposes, including controlling and adjusting the reaction conditions.

A person skilled in the art would appreciate that the above stated setup is one of the examples. Other proper setups are able to be applied to the system. For example, the reaction reactors 102 and 104 are able to be combined into a single reactor. Additional reaction reactors are able to be added.

Reactions

In some embodiments, a system uses the following reactions to generate hydrogen by decomposing water: (1) REDOX reaction, (2) pre-generation reaction, (3) generation reaction, (4) regeneration reaction, (5) second hydrogen reaction, and (6) oxygen reaction.

(1) REDOX Reaction

The REDOX reaction prepares a prehydrogen-generating substance by oxidizing or reducing the starting materials. Subsequently, the hydrogen-generating substance reacts with water or hydroxide. The REDOX reaction is illustrated in equation (1). Equation (2) illustrates that the prehydrogen-generating substance reacts with water to form the hydrogen-generating substance. A person skilled in the art will appreciate that the hydrogen-generating substance is able to carry a certain amount of surrounding water in its surrounding sphere.

$$M \rightarrow M^{x+} + xe^- \quad (1)$$

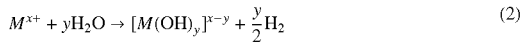

$$M^{x+} + yH_2O \rightarrow [M(OH)_y]^{x-y} + \frac{y}{2}H_2 \quad (2)$$

In the equations (1) and (2), M and its ion form represent the core of the hydrogen-generating substance and x and y represent charge parameters for an oxidation state or reaction stoichiometry.

A person of ordinary skill in the art will appreciate that the REDOX reaction is one exemplary model, and the starting material is not required to go through the REDOX reaction to become an active catalyst and/or a hydrogen-generating substance for the hydrogen generation. In some embodiments, the hydrogen-generating substance is the precursor of the actual hydrogen-generating catalysts, which generate hydrogen gas. Alternatively, the hydrogen-generating substance is the hydrogen-generating catalyst, and the starting material is the precursor of the hydrogen-generating substance.

(2) Pre-Generation Reaction

In some embodiments, the pre-generation reaction is a step of setting up the AID (Active Ion Displacement) condition for the generation reaction. The pre-generation reaction applies a minimum starting voltage (eg. 0.5V DC) to the electrodes in the solution that contains the hydrogen-generating substance. The pre-generation reaction makes the hydrogen-generating substance, such as [Al(OH)$_3$.xH$_2$O] complex, compact onto/couple with the Fe electrode surface. The pre-generation reaction is a process that requires a low energy potential. In some embodiments, it is observed that the pH of the solution is raised during the pre-generation reaction, and it is able to result from the liberation of the OH$^-$ groups to the solution.

(3) Generation Reactions

In some embodiments, the generation reaction generates hydrogen and depletes the hydrogen-generating substance. For example, when the hydrogen-generating substance is [Al(OH)$_3$], the generation reaction generates hydrogen gas and produces a depleted hydrogen-generating substance, [Al(OH)$_4$]$^-$. The substance [Al(OH)$_3$] is used herein as an example. The hydrogen-generating substance is also able to be [M(OH)$_4$]$^-$, [M(OH)$_3$], [M(OH)$_2$]$^+$, [M(OH)]$^{2+}$, M$^{3+}$, or other suitable chemicals that are able to perform similar reactions as described above.

Active Ion Displacement (AID)

In some embodiments, the generation reaction is achieved by an active ion displacement (AID) reaction. The chemical reaction of the AID is illustrated in equation (3).

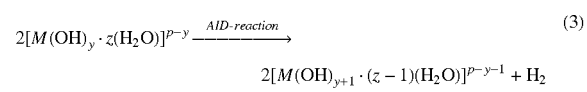

$$2[M(OH)_y \cdot z(H_2O)]^{p-y} \xrightarrow{\text{AID-reaction}} 2[M(OH)_{y+1} \cdot (z-1)(H_2O)]^{p-y-1} + H_2 \quad (3)$$

In the equation (3), [M(OH)$_y$.z(H$_2$O)]$^{p-y}$ is the chemical state of the hydrogen-generating substance before the generation reaction. Z represents the number of water molecules surrounding the core of the hydrogen-generating substance. P—Y represents the charges of the hydrogen-generating substance binding with y equivalents of hydroxide. Y represents the number of hydroxides binding to the hydrogen-generating substance before the AID reaction. Through the AID reaction, the [M(OH)$_y$.z(H$_2$O)]$^{p-y}$, with the assistance of applied electric charge, becomes [M(OH)$_{y+1}$.(z-1)(H$_2$O)]$^{p-y-1}$. Equation (3) is an example that illustrates the concept of the invention. For example, the [M(OH)$_y$.z(H$_2$O)]$^{p-y}$ is able to be [Al(OH)$_3$.x(H$_2$O)] and the [M(OH)$_{y+1}$.(z-1)(H$_2$O)]$^{p-y-1}$ is able to be [Al(OH)$_4$.(x-1)(H$_2$O)]$^-$. A person skilled in the art would appreciate that the hydrogen-generating substance is also able to be in other chemical states, contain any other suitable number of hydroxide groups, or contain other suitable ligands. In some embodiments, external heat aids the AID reaction.

The AID reaction is able to reduce water and associate the OH$^-$ group with the hydrogen-generating substance. The AID reaction is further illustrated in equation (4), where [Al $[Al(OH)_3 \cdot x(H_2O)]$ is used as an example of the hydrogen-generating substance. The x equivalent of water surrounding the core of the hydrogen-generating substance is used as an example. In some embodiments, the hydrogen-generating substance is able to use the water in the solution directly.

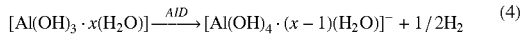
$$[Al(OH)_3 \cdot x(H_2O)] \xrightarrow{AID} [Al(OH)_4 \cdot (x-1)(H_2O)]^- + 1/2 H_2 \quad (4)$$

Figure 2A:
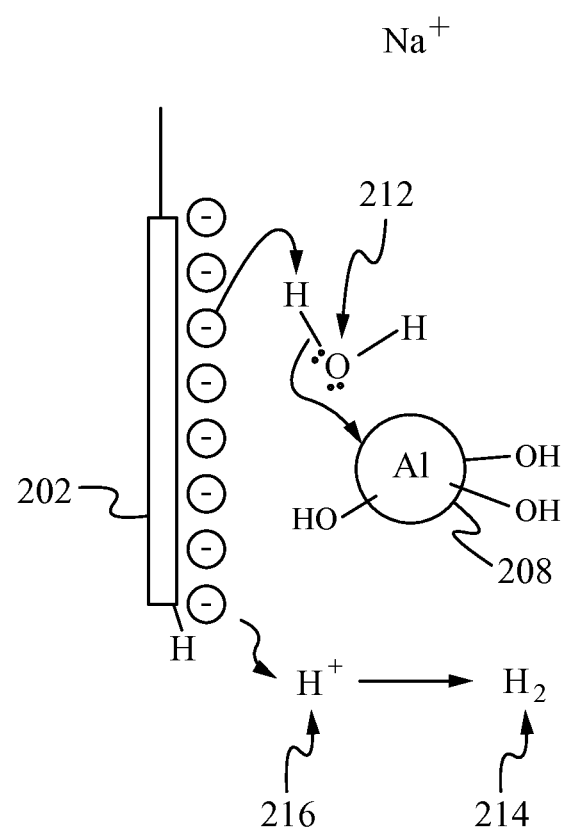
FIGS. 2A and 2B illustrate the generation and regeneration reactions in accordance with some embodiments.

FIG. 2A shows the reaction between the hydrogen-generating substance 208 and the water molecules 212. In some embodiments of the AID reactions, the hydrogen-generating substance 208 is $[Al(OH)_3 \cdot x(H_2O)]$, which reacts with the water molecules 212 and generates protons ($H^+$) 216 or hydrogen 214. The AID reactions are able to be assisted by an applied voltage potential to the electrode 202. These mechanisms are described as merely examples. A person skilled in the art would appreciate that the hydrogen gas is able to be generated through a hydride and a proton or any other suitable way of generating hydrogen gas. The hydrides and protons described in this disclosure are able to bind to the hydrogen-generating substance, be generated by the hydrogen-generating substance, and bind to other compounds in the solution. It is known by a person skilled in the art that amphoteric properties of aluminum hydroxides are able to add efficiency to the AID reaction of the generation reaction. It is observed that the pH of the solution is increased during the AID reaction, and it is able to be caused by the hydroxide generation or liberation in the AID reaction. In some embodiments, the pH value is able to be controlled by the concentration of Catalyst Base Formulation (CBF) fluid flow rate through the Reactor Core and Oxydizer. In some embodiments, the CBF is the hydrogen generation substance.

A person skilled in the art would also appreciate that the hydrogen-generating substance is able to generate hydrogen through protons, hydrides, or combinations thereof by a single molecule or by the cooperation of multi-molecules or atoms, such as alloys and a plurality of the same or different metal centers.

(4) Regeneration Reactions

In some embodiments, the regeneration reaction regenerates the hydrogen-generating substance from the depleted hydrogen-generating substance. For example, the $[Al(OH)_4 \cdot (x-1)(H_2O)]^-$ is able to be regenerated back to $[Al(OH)_3 \cdot x(H_2O)]$ or to $[Al(OH)_3 \cdot (x-1)(H_2O)]$.

The generation reaction and the regeneration reactions make the whole reaction work in a catalytic manner until the hydrogen-generating substance converts to a less active or another stable state (unusable compound).

The chemical equation of the regeneration reaction is illustrated in equation (5).

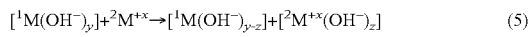
$$[^1M(OH^-)_y] + {}^2M^{+x} \rightarrow [^1M(OH^-)_{y-z}] + [^2M^{+x}(OH^-)_z] \quad (5)$$

In the equation (5), $[^1M(OH^-)_y]$ is the depleted hydrogen-generating substance, and $^2M^{+x}$ is a regenerating substance. The regeneration reaction strips or liberates the hydroxide group bonded to the depleted hydrogen-generating substance, so the hydrogen-generating substance regenerates from the state of depleted form, $[^1M(OH^-)_y]$, directly or indirectly back to the previous chemical state, such as $[^1M(OH^-)_{y-z}]$. The $^2M^{+x}$ is acting as a hydroxide shuttle, such as Ag, Ag(OH), Cu, and $Cu(OH)^{+1}$, that removes or carries the hydroxide group from the depleted hydrogen-generating substance. The above equation is an example to illustrate the concept of this disclosure. A person skilled in the art would appreciate that the hydrogen-generating substance is able to be in other oxidation states, contain any other suitable number of hydroxide groups, or contain other suitable ligands.

The regeneration reaction is able to dissociate the $OH^-$ group away from the hydrogen-generating substance to which $OH^-$ originally bonds. The regeneration reaction is illustrated in equations (6) and (7) using $[Al(OH)_4 \cdot (x-1)(H_2O)]^-$ as the example of the depleted hydrogen-generating substance. A person skilled in the art will appreciate that the regeneration reaction is also able to occur between $Ag(OH)_r$ and $Cu(OH)_r$, which are able to act as the hydroxide shuttle for each other. R represents the numbers of hydroxides that are associated with the core of the hydroxide shuttle, and the value of R is able to be 0, 1, 2, or any other suitable number.

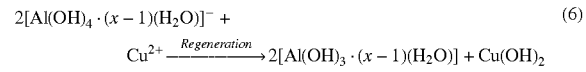
$$2[Al(OH)_4 \cdot (x-1)(H_2O)]^- + \quad (6)$$
$$Cu^{2+} \xrightarrow{Regeneration} 2[Al(OH)_3 \cdot (x-1)(H_2O)] + Cu(OH)_2$$

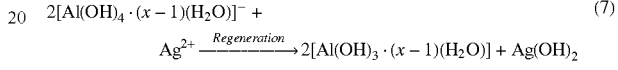
$$2[Al(OH)_4 \cdot (x-1)(H_2O)]^- + \quad (7)$$
$$Ag^{2+} \xrightarrow{Regeneration} 2[Al(OH)_3 \cdot (x-1)(H_2O)] + Ag(OH)_2$$

Figure 2B:
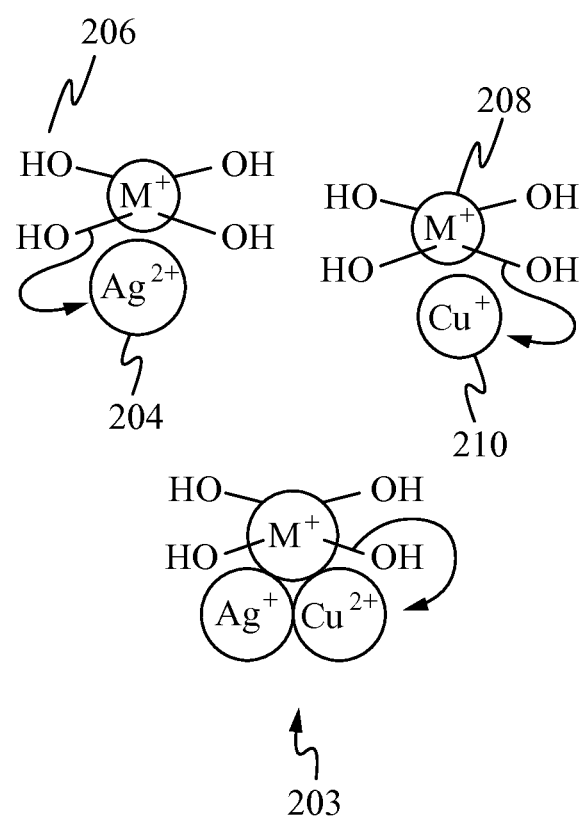

FIG. 2B illustrates a regeneration reaction in accordance with some embodiments. The hydrogen-generating substance 208 binds the hydroxide group 206. The hydroxide shuttles 203, 204, or 210 are able to take the hydroxide group 206 away from the depleted hydrogen-generating substance 208. The hydroxide shuttle is able to be a silver ion 204, a copper ion 210, an aluminum ion (not shown in the figure), multi-ion center aggregation 203, or other chemicals that take up the hydroxide group 206.

The term "regeneration reaction" includes any reactions that revive the depleted hydrogen-generating substance back to the hydrogen-generating substance that is active as a catalyst for assisting the electric hydrolysis. The term "hydroxide shuttle" is used as an illustration of the present invention, and the hydroxide shuttle is able to include any structure to remove any chemical substance from the hydrogen-generating substance. As such, the hydroxide shuttle is not limited to removing only hydroxyl groups. The hydroxide shuttle is able to act as a shuttle to remove hydrides, hydrogen, or other substances that bind to or associate with the hydrogen-generating substance.

(5) Second Hydrogen Reaction

In some embodiments, the generation reaction produces a depleted hydrogen-generating substance, which is bonded with the additional hydroxide group. The regeneration reaction uses hydroxide shuttles to take the hydroxide group from the depleted hydrogen-generating substance. After taking the hydroxide group from the depleted hydrogen-generating substance, the hydroxide shuttle bonds with the hydroxide group. Subsequently, the second hydrogen reaction converts the hydroxide group bonded on the hydroxide shuttle into hydrogen proton/gas and metal oxide. For example, $Ag^{2+}$ or $Ag^+$ takes hydroxide from $[Al(OH)_4 \cdot (x-1)(H_2O)]^-$ and becomes $Ag(OH)_2$ or $Ag(OH)$ through the regeneration reaction. The second hydrogen reaction converts $Ag(OH)_2$ into AgO and/or $Ag_2O$ and hydrogen. In some embodiments, the above-mentioned reactions occur in the main reactor (e.g., reactor 102 in FIG. 1).

(6) Oxygen Reaction

In the oxygen reaction, the oxygen of the metal oxide, which is generated in the second hydrogen reaction, is released from the metal oxide through photolysis, thermal decomposition, or other suitable chemical reactions or physical interactions. Through the oxygen reaction, the hydroxide shuttle is regenerated, and the hydroxide shuttle is able to take hydroxide from the depleted hydrogen-generating substance or other hydroxide shuttle having bonded hydroxide again. For example, the silver ion is regenerated from silver oxide (AgO) through an oxygen reaction. In some embodiments, the energy source of the photolysis for the oxygen reaction is visible light, UV waves, microwaves, radio frequency waves, gamma rays, x-rays, IR waves, or any other type of energy that a person skilled in the art would appreciate. In some embodiments, the metals that can be used as the hydroxide shuttle include aluminium, alumina, copper, iron, silver, zinc, magnesium, gallium, nickel, or any other metal or nonmetal material or compounds that are capable of taking up hydroxide groups. The metal ion mentioned above is able to be in various oxidation states. For example, a silver ion is able to be Ag metal, $Ag^+$, $Ag^{2+}$ or $Ag^{3+}$.

A person skilled in the art would appreciate that the oxygen reaction is able to be performed with heat, light, or other suitable energy sources. Further, a person skilled in the art will appreciate that the second hydrogen reaction and the oxygen reaction are able to be part of the hydrogen-generating reactions, and the so-called hydroxide shuttles are able to be part of the hydrogen-generating substance.

Overall Reactions

Figure 3:
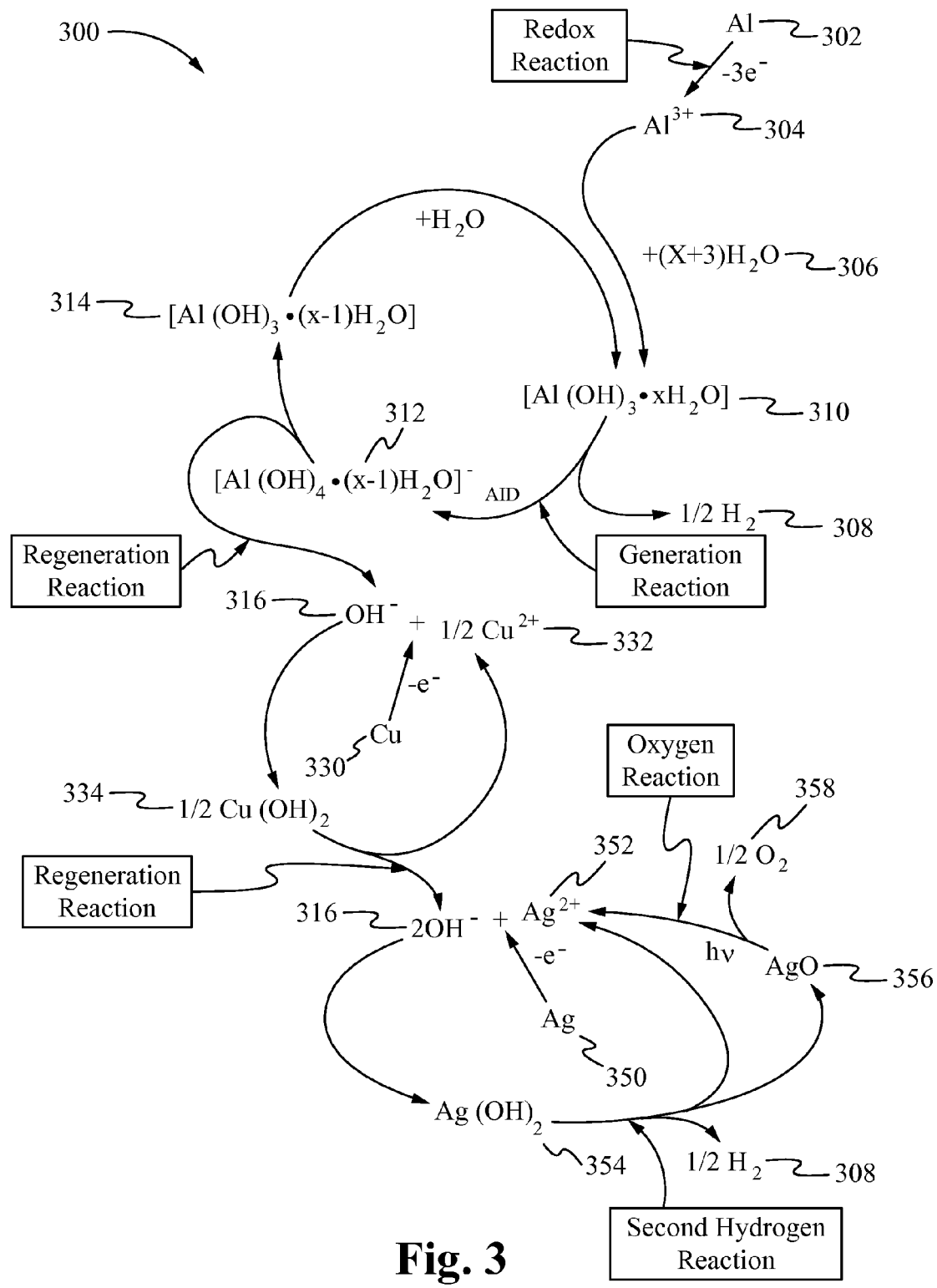
FIG. 3 illustrates the overall reaction of a system in accordance with some embodiments.

FIG. 3 illustrates an overall reaction cycle 300 in accordance with some embodiments. The reaction begins with an aluminium (Al) metal 302. Through the REDOX reaction, the Al metal 302 becomes $Al^{3+}$ 304. Alternatively, the aluminium ion 304 is generated from other sources of Al ion such as bauxite, $Na[Al(OH)_4]$, $Al(OH)_3$, $NaAlO_2$, $Na_2AlO_4$, $Na_5AlO_4$, $NaAl_{11}O_{17}$, or any other suitable Al ion sources. The Al ion 304 reacts with water ($H_2O$) 306, generating hydrogen gas 308 and the hydrogen-generating substance, aluminium hydroxide $[Al(OH)_3 \cdot x(H_2O)]$ 310. With the assistance of AID prepared hydrogen producing substrate after the pre-generation phasing, the hydrogen-generating substance 310 reacts with two surrounding water molecule. Hydrogen gas is generated in the generation reaction and the hydrogen-generating substance becomes a depleted hydrogen-generating substance, $[Al(OH)_4 \cdot (x-1)(H_2O)]^-$, 312. The regeneration reaction removes one $OH^-$ ion from $[Al(OH)_4 \cdot (x-1)(H_2O)]^-$ 312; thus, the depleted hydrogen-generating substance, $[Al(OH)_4 \cdot (x-1)(H_2O)]^-$, 312 becomes the substance $[Al(OH)_3 \cdot (x-1)(H_2O)]$ 314. Subsequently, the $[Al(OH)_3 \cdot (x-1)(H_2O)]$ 314 associates with water and turns back into $[Al(OH)_3 \cdot x(H_2O)]$ 310. Through the generation and regeneration reactions, the hydrogen-generating substance works in a catalytic manner.

In some embodiments, the regeneration reaction uses a copper ion 332 or a silver ion 352 as the hydroxide shuttle. The copper ion 332 and the silver ion 352 are able to be generated through REDOX reactions from metal copper 330 and silver 350 or prepared from other suitable ion sources. The hydroxide shuttles take up the hydroxide groups 316 and become a hydroxide-bonded hydroxide shuttle, such as $Cu(OH)_2$ 334 or $Ag(OH)_2$ 354. A person skilled in the art will appreciate that the hydroxide shuttle is able to be in various oxidation states and bonded with various numbers of hydroxides 316.

In some embodiments, the second hydrogen reaction generates more hydrogen and converts the hydroxide-bonded hydroxide shuttle, such as $Ag(OH)_2$ 354, into a metal oxide, such as AgO 356, or a silver ion.

In some embodiments, the oxygen reaction generates oxygen 358 and renews the metal oxide, such as AgO 356, into a renewed hydroxide shuttle. Through the second hydrogen reaction and the oxygen reaction, the hydroxide shuttles work in a catalytic manner.

Figure 4:
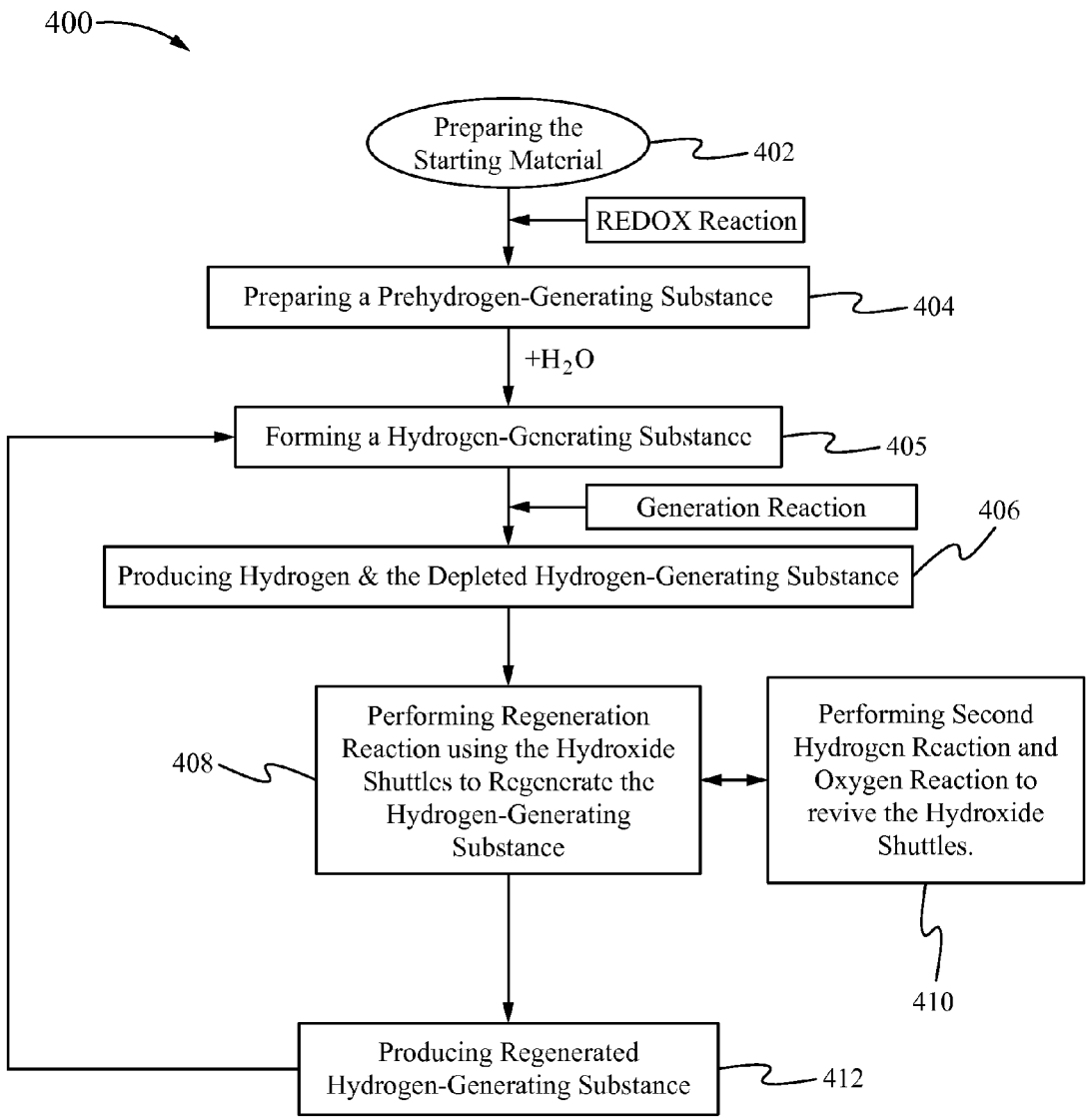
FIG. 4 illustrates a process of a hydrogen-generation reaction in accordance with some embodiments.

FIG. 4 further illustrates a process of the electrically controlled hydrogen-generation reaction 400 in accordance with some embodiments. The process begins with preparing the starting material 402. At the step 404, the hydrogen-generating substance is prepared by the REDOX reaction. At the step 405, the hydrogen-generating substance reacts with water and becomes active hydrogen-generating substance.

At the step 406, the generation reaction makes the hydrogen-generating substance react with water or intramolecular hydrolysis reaction through an applied voltage potential to produce hydrogen gas via electric-hydrolysis reactions. The hydrogen-generating substance becomes a depleted hydrogen-generating substance. At the step 408, the regeneration reactions use hydroxide shuttles to regenerate the depleted hydrogen-generating substance. At the step 410, the second hydrogen reaction and the oxygen reactions revive the hydroxide shuttle. At the step 412, the hydrogen-generating substance is regenerated. After the step 412 the process goes back to the step 405, and the whole reaction works in a catalytic manner.

A person skilled in the art will appreciate that the above process is merely one example. All steps are optional and additional steps are able to be added. Further, the reactions are able to go through other mechanisms.

EXPERIMENTS

Example 1

In some embodiments, an apparatus includes a main reactor, a photochemical/oxidizer reactor, and a thermal source. The main reactor core contains reactants or catalysts, graphite and stainless steel plates as electrodes. The photochemical/oxidizer reactor contains an energy source or an energy converter, such as a light source, a sunlight receiver capable of transforming sunlight in other forms, a solar water heater, or other proper lights or heaters.

The conditions and procedures of performing the reactions are described in detail below. The experiment begins with a catalyst preparation procedure. In the catalyst preparation procedure, water, salts, and the starting metals, including substrates of Al, Cu, and Ag, are placed into a catalyst preparation vessel. Next, the starting materials are prepared by using the REDOX reaction, which is described in the following paragraph. Subsequently, the product of the catalysts preparation reaction is transferred to the main reactor. The main reactor contains water, such as water prepared from tap water, distilled water, deionized water, or sea water. The salts are added to bring the salinity of the water to at least 1.5% using a refractometer by weight using NaCl.

In the REDOX reactions, the electricity is applied to the electrodes. A negative charge is connected to the graphite electrodes and a positive charge is connected to copper, silver, and aluminum electrodes. The reactions are started by applying a voltage sufficient large (e.g., 1.8 volts) to cause the Al, Cu, and Ag substrate to begin to liberate gas. The reactions are run for 30-40 minutes or until a gel suspension or heavy and frothy supernatant is developed. The solution is stirred occasionally until the supernatant completely dissolves into solution and forms a gelatinous suspension.

Following the catalysts preparation is the pre-generation reaction. In the pre-generation reaction, the anode in the main reactor (the stainless steel electrode) is conditioned for AID. In some embodiments, the temperature of the reaction is set in the range from 80° F. to 185° F. The negative charge of applied electricity is connected to the stainless steel electrode and the positive charge is connected to the graphite electrode. Before applying an electric voltage, the Cu, Al, and Ag metals are taken out of the solution. Next, 0.3V of electricity is applied. After the current is stabilized, the voltage is applied in increments of 0.01V until the voltage is roughly 0.4V or until $H_2$ gas is produced at the stainless steel substrate. In some embodiments, it is observed that the pH value of the solution increases quickly during the pre-generation reaction.

Following pre-generation phasing reaction, the generation reaction is performed. In the generation reaction, the voltage is initiated at 0.1V and increased by 0.05V increments, such as 0.105V, 0.110V, and 0.115V. The voltage is continuously increased up to approximately 0.820 volts or until the maximum amount of the gas is generated. During this phase, hydrogen gas is produced at the stainless steel substrate. Then the voltage is reduced by 0.05V until the gas production falls off.

The hydrogen gas in the above setup is produced from the stainless steel electrode. It is observed that during the reaction, the pH value quickly increases. After the reaction, the pH value decreases to about 6.5 after a period of about 12 hours (overnight) if the applied voltage potential is turned off.

In some embodiments of this renewable catalytic system, the reaction begins with 0.22 g of Al, 0.060 g of copper and 0.017 g of silver metals to produce five liters of gas.

After the above reactions, the hydrogen-generating substance is depleted, leaving in the main reactor a solution that contains the depleted hydrogen-generating substance and hydroxides-bonded hydroxide shuttles. The solution is transferred from the main reactor to the oxidizer reactor for oxygen reaction to revive the hydroxide-bonded hydroxide shuttles and hydrogen-generating substance. The gelatinous suspension contains the reactivated hydrogen-generating substance, and the solution containing the gelatinous suspension is then transferred back to the main reactor. The oxidizer reactor is able to be a photochemical reactor or the thermal converter. The oxidizer reactor is turned on when the pH value of the reacting solution increases. In some embodiments, the oxidizer reactor is turned on at all times.

Example 2

Figure 5:
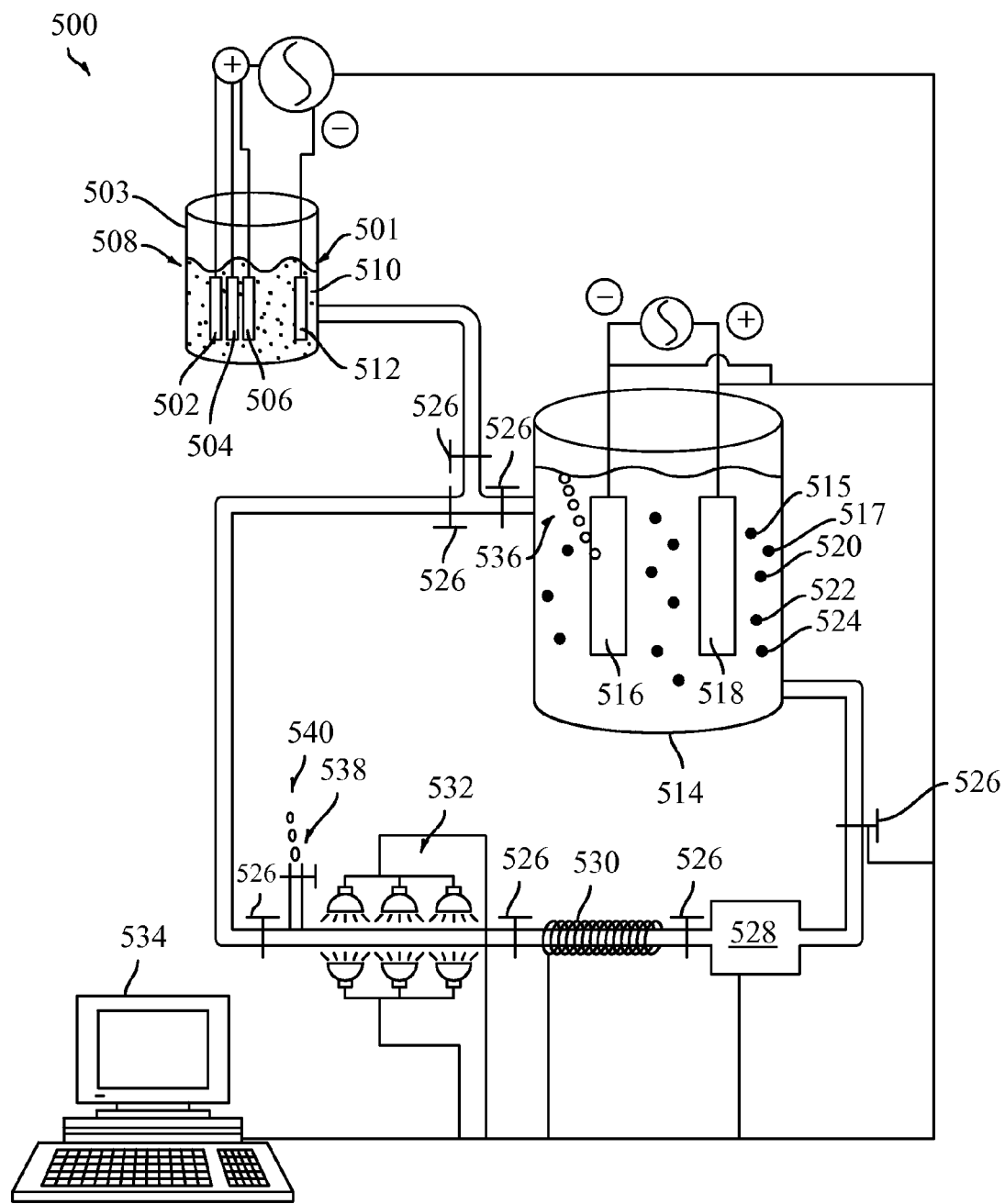
FIG. 5 illustrates a setup in some accordance with embodiments.

FIG. 5 illustrates a system 500 in accordance with some embodiments. The apparatus 500 includes a preparation reactor 503, a main reactor 514, a photochemical/oxidizer reactor 532, and a thermal converter 530.

In some embodiments, the experiments are performed as follows. The reaction begins with preparing a solution 501 containing 250 mg of Al 502 metal, 50 mg of Cu 504 metal, 25 mg of Ag 506 metal, a graphite electrode 512 and 1 liter of water 508 having 1.5% NaCl 510 by weight. A negative voltage of −1.7V is applied to the graphite electrode 512 and a positive is applied to the Al metal 502 for 15 minutes. Next, the first positive voltage applied to the Al metal 502 is removed, and a second positive voltage of 1.4V is applied to the Cu metal 504 for 10 minutes while the negative voltage of −2.5V is applied to the graphite electrode 512. Next, the second positive voltage is removed from the Cu metal 504, and a third positive voltage of 1.0V is applied to the Ag metal 506 for 5 minutes with the negative voltage still applied to the graphite electrode 512. The temperature of the solution is maintained at 88° F. In some embodiments, the procedures that are described above include ionizing the metals into the solution. In some embodiments, the procedures are for catalysts preparation.

Next, the solution 501 is transferred to the main reaction vessel 514. The main reaction vessel 514 contains aluminium ions 515, copper ions 517, silver ions 520, sodium ions 522, and chloride ions 524. The term "ion" comprises all ligand states of a metal. For example, an aluminium ion includes $Al^{3+}$ or $Al(OH)_x$, where the x represents the coordinated ligand numbers of the aluminium ion. In some embodiments, a voltage between 0.4V and 0.9V is applied to the cathode of the electrodes. In alternative embodiments, a voltage of 0.85V is applied to the cathode of the electrodes. In other embodiments, a voltage not exceeding 0.9V is applied to the cathode of the electrodes, because some experiments indicate that hydrogen production is reduced when a voltage exceeding 0.9V is applied. In some embodiments, the applied voltage of the anode is at 0V compared with a voltage on the standard hydrogen electrode. In alternative embodiments, the anode of the electrode is the reference electrode, which has a voltage of 0V. In some embodiments, the voltage is applied in a way that a negative charge is applied to the stainless steel electrode 516 and a positive charge is applied to the graphite electrode 518. A hydrolysis reaction begins to occur when sufficient voltage is applied, and hydrogen gas 536 is generated at the stainless steel electrode 516 when the voltage is applied to the stainless steel electrode 516 and the graphite electrode 518. After 30 minutes or when the amount of hydrogen gas production begins to decrease, the solution in the vessel 514 is transferred through the heater 530 and passed under the LED lights 532 to produce a photolysis reaction. Oxygen gas 540 is collected at the outlet 538 during the photolysis reaction. The solution is transferred back to the main reaction vessel 514 for hydrogen production.

In some embodiments, a control system 534 is connected to all the components of the system 500, including the preparation vessel 503, the main reaction vessel 514, valves 526, the heater 530 and/or heat exchanger, the LED lights 532, and all the electrodes 502, 504, 506, 512, 516, 518. In some embodiments, the control system 534 comprises one or more computers, which are able to automate the control of each of the components of the system 500. Accordingly, the control system 534 is able to automate the whole electric-hydrolysis process when predetermined conditions have been reached. For example, the control system 534 is able to initiate the reaction automatically by applying a voltage to the preparation vessel 503 when hydrogen gas is needed. The control system 534 is able to stop the ionization process of the metals automatically when a preset condition has been reached, such as, a preset pH value or an applied voltage. Similarly, the control system 534 is able to transfer the solution 501 automatically to the various chambers or vessels by controlling the pump 528 and the valves 526.

The control system 534 is able to control the system 500 remotely. For example, the system 500 is able to be controlled through a website, over the Internet or using a telephone or PDA. In some embodiments, all of the processes of the system 500 are able to be all automated, triggered by at the occurrence of predetermined conditions, such as by using a preset timer or indicator of low fuel of a car.

Figure 6:
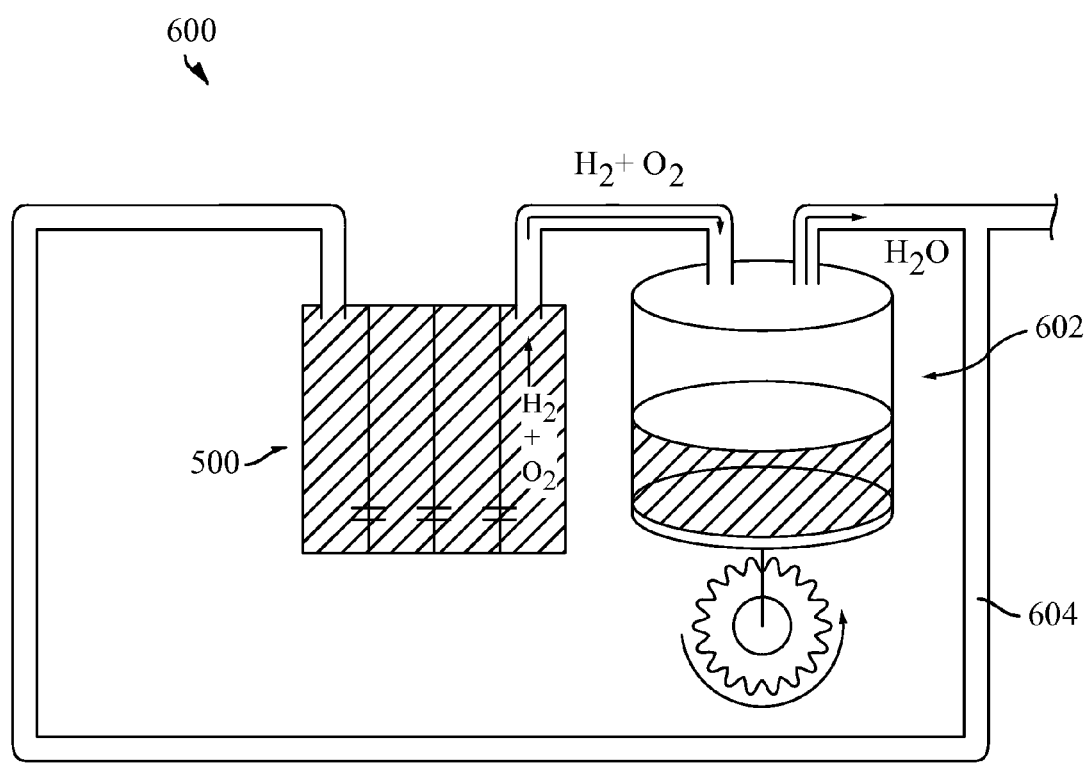
FIG. 6 illustrates an in-situ hydrogen and oxygen production system in accordance with some embodiments.

FIG. 6 illustrates an in-situ hydrogen and oxygen production system 600 in accordance with some embodiments. In operation, the system 600 is able to include the system 500 for in-situ and on-demand hydrogen and oxygen production. The hydrogen and oxygen gas produced is able to go through the same or independent channels 604 to an internal combustion engine 602, which is able to be installed on a car. The water generated through the hydrogen and oxygen combustion reaction can be recycled back to be used again in the system 500.

The in-situ hydrogen and oxygen production system 600 is able to provide fuels, hydrogen gas, and oxygen gas on-demand. Accordingly, the system 600 is able to eliminate or replace the need of having high pressure hydrogen gas stored on a vehicle. As a result, the danger of a high pressure storing/distribution device explosion is able to be eliminated or avoided.

Figure 7:
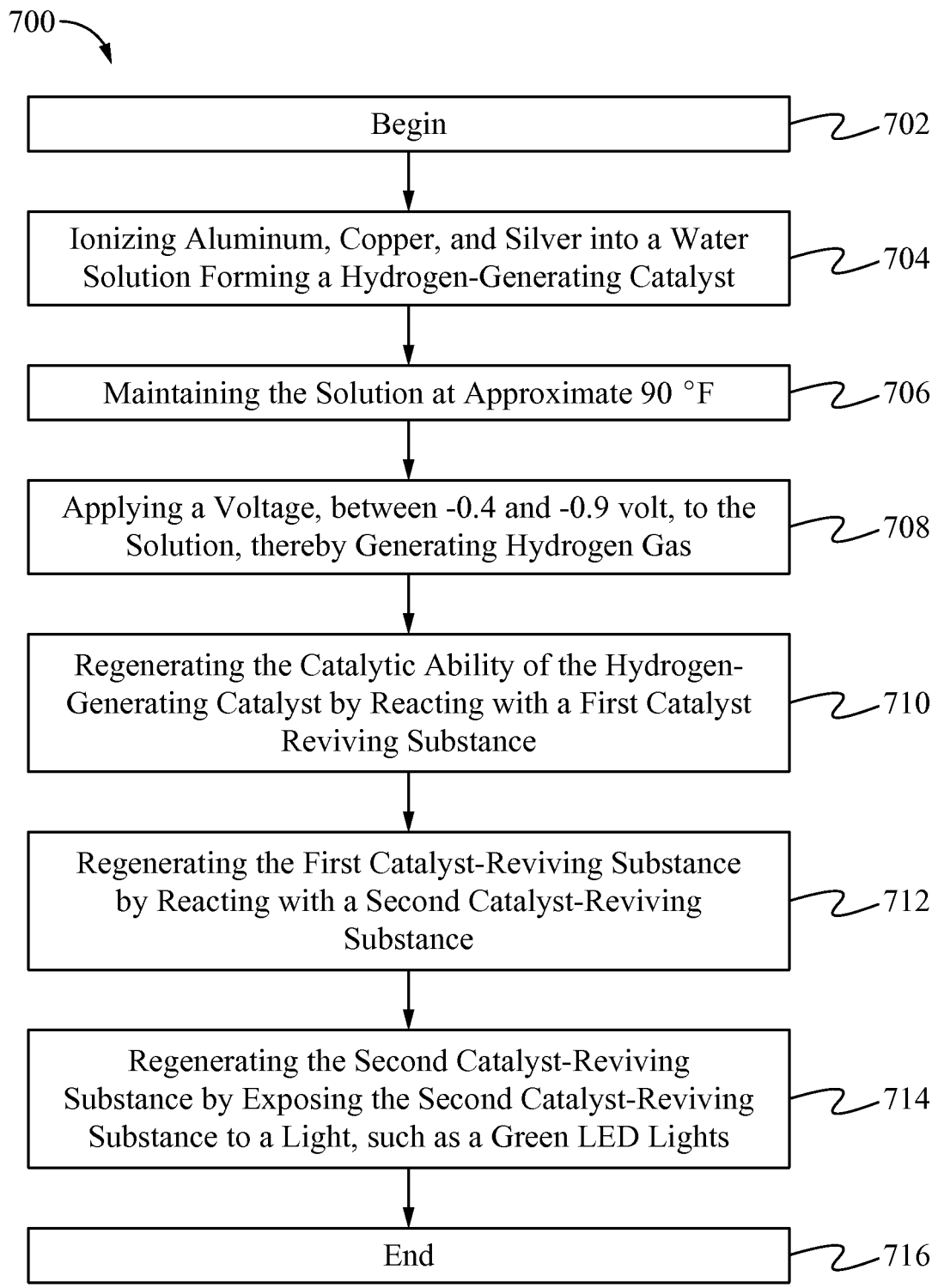
FIG. 7 illustrates a method of electric-hydrolysis reaction for hydrogen production in accordance with some embodiments.

FIG. 7 illustrates a method of electric-catalytic-hydrolysis reaction 700 for hydrogen production in accordance with some embodiments. The method begins at the step 702. At a step 704, aluminum, copper, and silver are ionized into a water solution, forming a hydrogen-generating catalyst. At a step 706, the solution is maintained at approximately 90° F. At a step 708, a voltage, between −0.4 and −0.9 volts, is applied to the solution or the cathode of the electrodes, thereby generating hydrogen gas. At a step 710, the catalytic ability of the hydrogen-generating substance is regenerated by reacting with a first catalyst-reviving substance. At a step 712, the first catalyst-reviving substance is regenerated by reacting with a second catalyst-reviving substance. At a step 714, the second catalyst-reviving substance is regenerated by exposing it to a light, such as green LED lights. The method 700 ends at a step 716.

In the following paragraphs, methods of controlling and maintaining a stable hydrogen production system in accordance with some embodiments are provided. FIGS. 8a and 8b illustrate equations of a hydrogen-production scheme in accordance with some embodiments. Referring to FIG. 8a, in equation 802, under the influence of AID, $Al(OH)_3$ reacts with water forming $[Al(OH)_4]^-$ and a proton ($H^+$). Next, the hydroxide ($OH^-$) of the $[Al(OH)_4]^-$ is removed by the AgCu$(OH)_2$ or any other compounds and also by conditions, such as cooling, that are capable of removing the OH-. As shown in equation 804, $AgCu(OH)_2$ removes the hydroxide ($OH^-$) from $Al(OH)_4^-$, so that the $[Al(OH)_4]^-$ is converted back to $Al(OH)_3$, which is able to react with water molecules again. In some embodiments, the silver changes its valence, so that the silver is able to be oxidized from a zero (0) to +1 charge. A person of ordinary skill in the art would appreciate that the silver is able to be oxidized to +1, +2, and/or +3 charges and carry 1, 2, and/or 3 hydroxide groups ($OH^-$), respectively. The protons in the solution are able to accept electrons and form hydrogen gas, which is able to be removed from the solution for collection, to be used as fuel. In equation 806, the silver hydroxide, $Ag(OH)$, is able to be converted to silver oxide ($Ag_2O$) and water. In equation 808, light energy, such as LED, and/or heat is able to be used to convert the silver oxide ($Ag_2O$) into silver(0) and oxygen gas.

FIG. 8b provides an alternative hydrogen production scheme in accordance with some embodiments. The silver chemistry described in FIG. 8b is able to be catalytic reactions that produce hydrogen gas. Alternatively, the silver chemistry described in FIG. 8b is able to be part of chemical reactions that work in conjunction with the chemical reactions described in FIG. 8a and/or other chemical reactions to produce hydrogen gas. In Equation 820, $Ag^0$ reacts with water to produce hydrogen gas, $Ag^+$, and $OH^-$. In some embodiments, the $Ag^0$ reacts with water at the stainless steel substrate, giving off two electrons to the AID layer and providing $2H^+$ protons for producing hydrogen gas. The oxidation reaction of Ag is able to go up to various oxidation states, such as +1, +2, +3, or any other oxidation states that Ag can reach. In Equation 822, $OH^-$ is able to associate with $Ag^+$ to generate $Ag_2O$ and $H_2O$. In Equation 824, the $Ag_2O$ is able to be reduced to become $Ag^0$. The chemical reactions described herein are in accordance with some embodiments. Any other chemical reactions that are capable of producing hydrogen gas are applicable, so long as the chemical reactions are within the scope of the disclosure.

Figure 9:
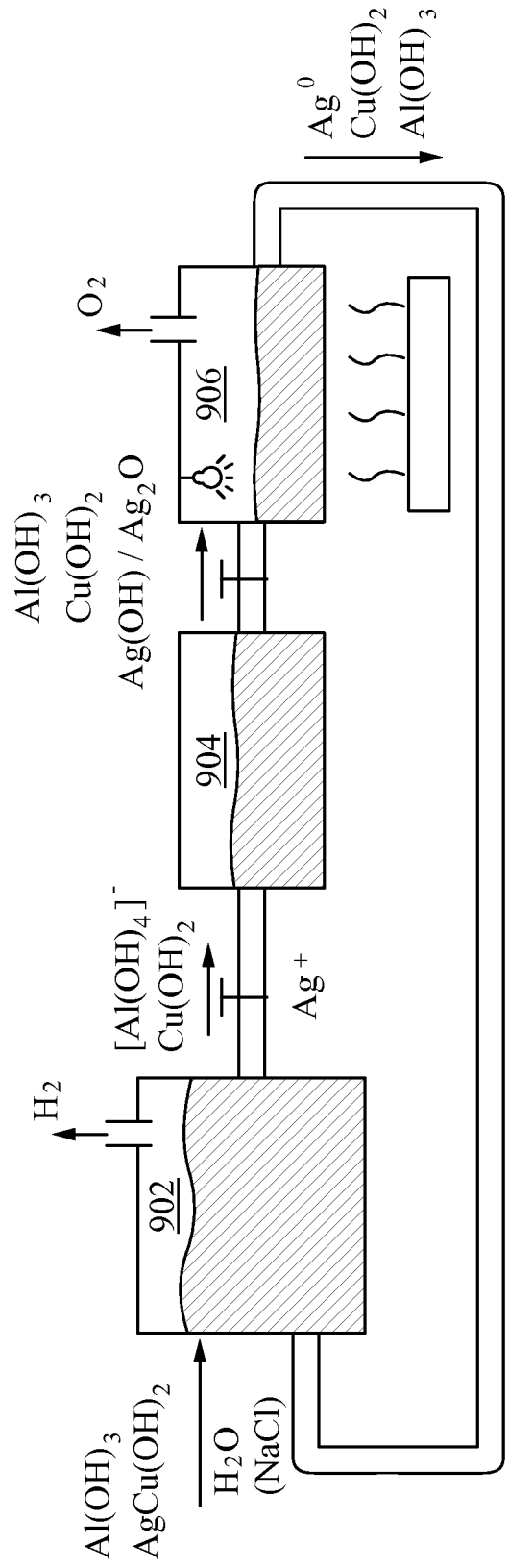
FIG. 9 illustrates a hydrogen production system in accordance with some embodiments.

FIG. 9 illustrates a hydrogen production system in accordance with some embodiments. FIG. 9 is able to be read together with the chemical reactions described in the FIGS. 8a and 8b and their associated texts. As shown in FIG. 9, a solution containing $Al(OH)_3$, $AgCu(OH)_2$, water and NaCl is able to be transported into a core chamber 902. The core chamber 902 is able to function in a way similar to the main reactor 102 (FIG. 1). The solution containing $Al(OH)_3$, AgCu$(OH)_2$, water, and NaCl is able to be prepared from starting materials, such as Al metal, Cu metal, Ag metal and salt water. Alternatively, the solution is able to be received from other chambers and can contain chemicals regenerated from [Al$(OH)_4]^-$ and $Ag_2O$. The equations 802, 804, 820 and 822 (FIGS. 8a and 8b) are able to occur and hydrogen gas is able to be produced in the core chamber 902. Next, the solution is able to be transported to an accumulator chamber 904 and/or an oxygen chamber 906. The solution that is transported to the accumulator chamber 904 is able to contain $[Al(OH)_4]^-$, $Cu(OH)_2$, $Ag^+$, or a combination thereof. In some embodiments, the solution is able to contain at least one substance, such as silver ion complex $[Ag(OH^-)_x]$ or copper ion $[Cu(OH^-)_x]$ complex, that is capable of taking at least one hydroxide ($OH^-$) group from the aluminium ion complex, which is used to produce hydrogen gas. With the $OH^-$ removing mechanism, the aluminium ion becomes active again and is capable of producing protons and hydrogen gas. The subscript "x" mentioned above denotes the number of hydroxide groups complexed with the metal ions. The number "x" is able to start from 0, to 1, 2, 3 . . . etc. The accumulator chamber 904 is optional. The equations 806, 808, 822 and 824 are able to occur in the accumulator chamber 904, the oxygen chamber 906, or a combination thereof. The accumulator chamber 904 and/or the oxygen chamber 906 are able to function similarly to the oxidizer reactor 104 (FIG. 1) and/or the heat source 108 (FIG. 1) described above. With the assistance of the light or heat energy, the silver oxide ($Ag_2O$) is able to oxidize the oxygen ($O^{2-}$) atom of the $Ag_2O$ to become oxygen gas ($O_2$) and reduce the silver ion of the $Ag_2O$, such as $Ag^+$ to $Ag^0$, so that the $Ag^0$ is able to be used as the hydroxide group receiver/remover, which is able to be used to remove at least one $OH^-$ group from $[Al(OH)]^-_4$ or a substance that is generated after the hydrogen-production reaction.

In some embodiments, the progress of the chemical reactions in the various chambers disclosed herein are controlled by a computer system, which is able to be similar to the computer-control system 106 of FIG. 1. In some experiments, it is found that hydrogen gas is produced if the pH value in the main core chamber (reactor core chamber) 902 is maintained in the range of 7.0-8.5, and the hydrogen-gas production is ceased if the pH value in the main core chamber 902 is higher than 9.7 or 10.5. Accordingly, methods of controlling a hydrogen gas production system are provided herein for maintaining a stable hydrogen gas production system. For example, the methods are able to use the computer system to control and ensure that the pH value in the chambers is in a predetermined range, such as a pH range between 8.4 and 9.5. A person of ordinary skill in the art would appreciate that any other pH ranges are able to be used, so long as the system is able to provide a continuous and/or stable production of hydrogen gas. The methods are able to be performed by controlling the intensity, wavelength, time, power, or a combination thereof of the illumination. With the control of the illumination, such as by increasing/decreasing the intensity of the illumination, the efficiency and rate of the hydrogen gas production are able to be controlled and/or optimized. In alternative embodiments, the methods of controlling the hydrogen gas production are able to be controlled by controlling the regeneration of at least one of the hydrogen producing substances, such as regenerating $Ag_2O$ to $Ag^0$. In some embodiments, the control of the $Ag^0$ concentration in the system and regeneration rate/efficiency is able to be one of the controlling factors to maintain or optimize the hydrogen gas production described herein. Similarly, the systems and methods disclosed herein are able to use the computer system to control/automate the control system to ensure a stable hydrogen production system by maintaining the reactions to occur in a steady state, a dynamic equilibrium, and/or narrowed operating conditions, such as within predetermined temperature ranges, lighting conditions, and activation voltages.

As described above, some embodiments of the present invention are able to include the following chemical reactions: a REDOX reaction, a pre-generation reaction, a generation reaction, a regeneration reaction, a second hydrogen reaction, and an oxygen reaction. Alternatively, some embodiments are able to include the following chemical reactions: a catalyst preparation reaction, a hydrogen generation reaction, a catalyst regeneration reaction, and a regeneration reaction to regenerate the catalyst regeneration substance.

It has been observed that the pH value of the catalytic system dropped below 7.0-6.5 or to slightly acidic levels when the system is shut down overnight. This is able to be resulted from the conversion of the free $OH^-$ that remained in the solution by $Al(OH)^{2+}$.

In some embodiments, it is found that the lack of chloride ions ($Cl^-$) in the reaction solution can result in preventing a complete pre-generation phasing reaction from occurring which in turn prevents generation reactions and the production of hydrogen. This is evidenced when sodium carbonate ($Na_2CO_3$) is substituted for sodium chloride ($NaCl_{(aq)}$) or sea water.

Selected Experiments Results

In some experiments, the $H_2$ production rate falls off from 20 ml/min to 2 ml/min after several hours of operation. The reactor is drained and placed in a cool dry place to let the catalyst settle overnight. The next morning, or whenever the system is started up again, it is found that the reaction immediately starts back up with high hydrogen production rates. Again, the hydrogen production rate falls off over a period of time during operation. This indicates that a regeneration reaction is able to be a result of the thermal collapse. It is also found that the pH of the catalyst base is about 10 to 11.5 at the end of the testing. Overnight, the pH dropped to roughly 6.5 to 7.2.

In another experiment, it was found that the presence of light is able to reduce the required catalyst activation voltage and current to almost 0. In some experiments, a microscopic analysis of sediment precipitates was performed. The analysis showed that distinctive Ag micro silvery crystalline precipitates are generated at the bottom of the reactor core, tubes, and other vessels when the catalyst base formulation having Ag (in the form of AgO) is present in the solution and little or no copper (in the form of copper hydroxide) is in solution. In the case with a nearly equal molarity of Ag:Cu, no crystals are formed and a shift in color of the catalyst formulation from brownish to blood red is observed.

Catalyst Formulation:

In some experiments, the catalyst formulation contains 500 mg/liter of aluminum, 150 mg/liter of copper, and 75 mg/liter of silver at a temperature of 130° F.

Experiment 1

In some experiments, the Hydrogen Production Unit (HPU) ran at 10-20 ml per minute. The pH tested at a location after the reactor core was high, between 7.8-10, and the pH increases to 10-11.7 after the Oxidizer chamber (Oxy). It is observed that the catalyst base showed blood red and nearly opaque. The temperature was held at 130° F. When the activation voltage was held between 140 and 155 mV, the $H_2$ flow rate remained stable at 11-20 ml/min, the pH of HPU remained stabilized at about 8.0, and the pH of Oxy was about 10.5. When the activation voltage was held between 250 and 300 mV, the $H_2$ flow rate decreased to 3-5 ml/min, the pH value of HPU increased and became stabilized at about 9.5, and the pH value of the Oxy was at about 11.3. When the activation voltage was held between 400 and 850 mV, the $H_2$ flow rate decreased to 2-3 ml/min, the pH value of HPU quickly increased and became stabilized at about 10.5, and the pH value of the Oxy was at about 11.7. It was observed that the laser diodes used were operating at about 30% capacity. The laser diode used was a 1 W, class 4, green 525 nm wavelength diode.

Experiment 2

In some experiments, there were times that hydrogen production peaked for 2-3 minutes and then came down immediately. An $H_2$ flow rate between 50 ml/min and 200 ml/min was detected. The flow rate decreased and it took about another 20 minutes to get $H_2$ peak production again. This is able to result from the breaking loose of the $Ag_2O$ precipitation from where it accumulated. Subsequently the reaction is able to run in an usual condition again.

Experiment 3

In some experiments, the Oxy was upgraded to increase the surface area and radiation opportunity. The intensity of the light source was increased from ten units of 100 mW laser diodes described above to a 100 watt incandescent bulb. The result was a consistent 15 ml/min (an 800% increase) in hydrogen flow rate. The $H_2$ flow rate still fell off over a longer period of time and came back in intermittent spurts.

This increase in $H_2$ flow rate is able to result from the increase in oxidizer efficiency by increasing illumination. On inspection of the HPU components, a grayish and whitish silty precipitate was found on the floor of the reactor core, in the fluid lines to the accumulator, on the accumulator floor, and in the lines to the oxidizer. This silt was placed into an Erlenmeyer flask and placed on a window sill. Over time, water vapor formed around the neck and eventually the silt disappeared.

Experiment 4

In some experiments, hydrogen chloride (HCl) was substituted for NaCl in the formation of the catalyst base. The result showed that an increase in hydrogen production rate was not in stoichiometric relation to the amount of HCl added.

Experiment 5

In some experiments, sodium hydroxide (NaOH) was substituted for NaCl in the formation of the catalyst base. The result showed an inability to complete pre-generation phase.

Observations:

As Ag concentration increases, overall pH of the system decreases. When the Ag concentration is greater than the concentration of $Cu(OH)_2$, Ag begins to precipitate as a metal. This is able to result from the lack of $Cu(OH)_2$ available to amalgamate with the Ag metal. Cooling of the fluid exiting the reactor core resulted in the increase of pH, which is able to result from an amphoteric reaction with $Al(OH)_{4-1}$ complexes, which liberates $OH^-$. This is able to trigger an Ag reaction: $2Ag^{+2} + 2OH^- \rightarrow Ag_2O + H_2O$.

A trend is observed that a lower activation voltage (e.g., 150-155 mV) is able to result in higher flow rates than flow rates that are generated when using a higher activation voltage (e.g., 250 mV). It is observed that the activation voltage is inversely proportional to the $H_2$ flow rate. In addition, as the activation voltage increased, the pH of both Reactor Core and Oxy increased. The lower the pH in the Reactor Core (pH<8.0), the higher the $H_2$ flow rate (AID reaction rate).

Some factors are able to be used to improve the efficiency of the hydrogen production, including: adding Reactor Core Graphite Hats to improve parallel surface reactions, increasing the reacting surface area (e.g., using radial substrates), improving the recovery of stray $Ag_2O$ from Oxidizer (e.g., precipitate recovery), and streamlining the flow of fluid through substrates to maximize the transfer of $Ag_2O$.

A low activation voltage (e.g., 150 mV) is able to ionize Ag to $Ag^{+1}$. Such a low activation voltage still has the potential to convert Ag directly or indirectly to $Ag_2O$ compounds. Higher activation voltages (e.g., higher than 250 mV) are able to cause the system to be unstable in the $H_2$ production rate and higher unfavorable pH values. This is able to result from the formation of $Ag^{+2}$, leading to the formation of AgO, which needs further time to break down into $Ag_2O$. Accordingly, the hydrogen production efficiency of the system is able to be controlled and optimized by adjusting the conversion from AgO to $Ag_2O$, which is able to be part of the rate determination step (r.d.s.) of the hydrogen production system.

In the oxidizer, $Ag_2O$ is able to be decomposed to react with copper hydroxide complex to form $AgCu(OH)_2$ amalgam and ½ $O_2$. $AgCu(OH)_2$ is then transported to the reactor core's hydrogen-producing substrate, which pulls a selected number of electrons from the AgO metal (depending on activation voltage) to create an Ag+1, +2, or +3 ion. $Ag^{+x}$ ions react with free hydroxide ions (liberated from the amphoteric-thermal collapse of the $Al(OH)_{4+1}$ in the fluid in a downstream location of the reactor core) to eventually reduce to $Ag_2O$, AgO, $Ag_2O_3$. The cycle is able to occur repeatedly.

In some embodiments, the activation voltage is set to 150 mV, causing the metal amalgam to create $Ag^{+1}$ ions. One equivalent of $Al(OH)_{4+1}$ complex is able to liberate one $OH^-$ group, which is able to be used to generate $Ag_2O$. In other embodiments, the activation voltage is set to 250 mV, causing the metal amalgam to create $Ag^{+2}$ ions. Two equivalents of $Al(OH)_{4+1}$ complexes are able to generate two equivalents of $OH^-$ groups, which are able to result in AgO. In some other embodiments, the activation voltage is set to 400+mV causing the metal amalgam to create $Ag^{+3}$ ions. Three equivalents of $Al(OH)_{4+1}$ complexes are able to generate three equivalents of $OH^-$ groups, which are able to be used to generate $Ag_2O_3$.

Some functional factors are able to contribute to the stability of the Active Ion Displacement process including: (1) substances transported from Oxy to Core—the system is adjusted to have $AgCu(OH)_2$ complex able to move from the oxidizer into the reactor core in order to convert the Ag metal into the specified valance; (2) reaction time for the reaction solution between Core to Oxy—sufficient reaction time is given to form $Ag_2O$ complexes between the reactor core substrates and the Oxidizer; (3) Oxy efficiency—the oxidizer is illuminated, and the amount of $Ag_2O$ complexes are reduced, forming $AgCu(OH)_2$ complexes, which then need to be transported into the reactor core; (4) Core buildup—the system is able to be designed to transport $Ag_2O$ into Core, which was not decomposed in the Oxidizer; (5) $Ag_2O$ transit buildup—$Ag_2O$ is able to build up (e.g., between the Core, Accumulator, and the Oxidizer) and the flow is able to be optimized to keep the precipitates moving; and (6) AID surface reaction area—the galvanic interaction distances are able to be optimized to maximize the AID surface reaction area.

Some factors are able to be used to improve the stability of the hydrogen production system. The factors include (1) ensuring one-way flow of the reactor core fluids, (2) ensuring that the substances/precipitants in reactor core have been transported from the reactor core to the oxidizer, (3) ensuring a sufficient flow, so that the precipitate does not build up in any part of the pipes. (This factor is related to turbulence management and downward-looking connections), (4) ensuring that there is enough surface area in the vicinity of the laser exposure, (5) ensuring that there is a delayed process flow from the reactor core to the oxidizer (accumulator) in order to react the $Ag^{+x}$ ions completely with the $OH^-$ groups, (6) collapsing the temperature downstream from the Core to maximize the amphoteric change of $Al(OH)_{4-1}$ complex due to the thermal collapse of the fluid, (7) ensuring that the reactor core substrates have parallel galvanic interactions on both the top and bottom of the reactor core substrates, which is able to maximize reactor core active sites on the surfaces, and (8) finding silver chemistry's pH equilibrium for various complexes of silver, to optimize pH for optimal operation of the system.

More factors are able to affect the stability of the reactions. In some embodiments, fluid transportation rates (fluid moving rates) are able to affect the hydrogen production reaction. It is observed that a fluid flow optimized rate in the reactor core (e.g., the hydrogen production chamber) past the hydrogen producing substance is between 25% and 50% of the velocity of a hydrogen bubble moving through the fluid to the surface. In some embodiments, the hydrogen bubbling rate is 3 inch/second. Accordingly, one of the optimized rate for transporting/moving the fluid components in the hydrogen production reactor is between 0.75 inch/second and 1.5 inch/second. It is possible that such fluid moving rates provide an ideal generation reaction condition allowing the exhausted hydrogen generation substance to react and be removed from the site while maintaining but not sweeping away the prepared pregeneration phasing surface barrier. In some embodiments, the pore size of the honeycomb structure (substrate/electrode) is able to affect the hydrogen production rate. In some experiments, it is found that the pore size between ⅜ inch and 1/16 inch is an ideal size. In some embodiments, the pore size is ⅛ inch. The size of the pore is able to affect the flow rate of the fluid within the substrates/electrodes. Accordingly, the pore size of the substrate, the flow rate of the fluid, or a combination thereof is the controlling factor that affects the rate and stability of the hydrogen production reaction. An automatic system and/or computer-assisted system are able to be configured to monitor and control the above factors to provide a stable/suitable hydrogen production system.

The embodiments disclosed in this disclosure provide apparatuses for and methods of on-demand hydrogen and oxygen production. Further, reactants and catalysts used in this disclosure are environmentally sustainable and safe materials. Such advantageous features are able to be applied in various fields, such as fuel technology, renewable energy, batteries, food production, petrochemical, cement, and car industries.

Optimization of the hydrogen generation reaction includes maintaining the continuously running of the hydrogen production reaction and the electric-catalytic-hydrolysis system, increasing the turnover-rate or turn-over number of the catalysts, having a higher hydrogen production rate and/or amount in a given time period, increasing the stability of the electric-catalytic-hydrolysis system, and reducing energy/materials required for the hydrogen production. A person of ordinary skill in the art appreciates that optimization includes adjusting any reaction conditions (such as lighting, temperature, sequences and timing of transporting reaction components among reaction chambers), so that the hydrogen production/generation is able to sustain and continuously run. A person of ordinary skill in the art appreciates that any physical/chemical factors are able to be varied as part of reaction condition adjustment or optimization including intensity, duration, rate, efficiency, amount, and a combination thereof. For example, an applied lighting intensity is able to be adjusted concurrently with applied lighting duration so that the generation of hydrogen gas efficiency is optimized to optimal condition.

The metal ions, such as an aluminum ion, a copper ion, and a silver ion, referred herein include metal ions in any charge states and associate with any anions. For example, aluminum ion is able to be $Al^{3+}$ or $Al^{4+}$ charges and in the form of $Al(OH)_4^-$, $Al(OH)_3$, $Al(OH)_2^+$, $Al(OAc)(OH)$.

All the steps that are contained in the methods/procedures described above are merely illustrative of the principles of the invention. All the steps are optional and all the steps, when applicable, are able to be performed in different sequences as desired. Additional steps are also able to be added when a person skilled in the art deems proper.

The present invention has been described in terms of specific embodiments incorporating details to facilitate the understanding of principles of construction and operation of the invention. Such reference herein to specific embodiments and details thereof is not intended to limit the scope of the invention. It will be readily apparent to one skilled in the art that other various modifications may be made in the embodiment chosen for illustration without departing from the spirit and scope of the invention.

What is claimed is:

1. A method of maintaining a performance of an electric-catalytic-hydrolysis system comprising:
   a. preparing the electric-catalytic-hydrolysis system comprising a reactor core and an oxidizer reactor, wherein a basic solution is maintained within the reactor core and contains a hydrogen generating catalyst, wherein the hydrogen generating catalyst contains an aluminum complex, a copper complex, and a silver complex;
   b. optimizing hydrogen production by maintaining a pH value of the basic solution in the reactor core below 9.5; and
   c. regenerating the silver complex by photolysis utilizing a light providing device within the oxidizer reactor.

2. The method of claim 1, wherein the optimizing hydrogen production comprises maintaining the of the basic solution in the reactor core pH value below 8.5.

3. The method of claim 1, wherein the optimizing hydrogen production comprises maintaining the pH value of the basic solution in the oxidizer reactor below 11.

4. The method of claim 1, wherein the optimizing hydrogen production comprises optimizing an amount of the hydrogen generating catalyst.

5. The method of claim 4, wherein optimizing the amount of the hydrogen generating catalyst comprises increasing a regeneration rate of the hydrogen generating catalyst.

6. The method of claim 5, wherein the regeneration rate of the hydrogen generating catalyst comprises a rate of converting a reacted hydrogen generating catalyst back to the hydrogen generating catalyst.

7. The method of claim 1, wherein optimizing the hydrogen production comprises optimizing a regeneration rate of an $Ag^0$.

8. The method of claim 1, wherein optimizing the hydrogen production comprises optimizing an amount of an $Ag^0$, an $Ag^{1+}$, or a combination thereof.

9. The method of claim 1, wherein optimizing the hydrogen production comprises increasing the rate of dissociating oxygen from the silver complex within the oxidizer reactor.

10. The method of claim 1, wherein optimizing the hydrogen production comprises converting a hydroxide of a hydroxide containing compound into an oxide of a metal oxide.

11. The method of claim 1, wherein optimizing the hydrogen production comprises increasing the rate of dissociating a hydroxide from the copper complex.

12. The method of claim 1, wherein regenerating the silver complex by photolysis comprises optimizing light providing duration, a light providing intensity, or a light providing frequency, a combination thereof through the light providing device.

13. The method of claim 1, wherein optimizing the hydrogen production comprises optimizing a voltage providing amount, a current providing amount, or a combination thereof through the electric energy providing device.

14. A method of maintaining a performance of an electric-catalytic-hydrolysis system comprising:
   a. preparing the electric-catalytic-hydrolysis system comprising a reactor core and an oxidizer reactor, wherein a basic solution is maintained within the reactor core and contains a hydrogen generating catalyst, wherein the hydrogen generating catalyst contains an aluminum complex, a copper complex, and a silver complex;
   b. optimizing hydrogen production by maintaining a pH value of the basic solution in the reactor core below 9.5; and
   c. regenerating the silver complex by thermolysis utilizing a heat providing device after the reactor core.

15. The method of claim 14, wherein the optimizing hydrogen production comprises maintaining the pH value of the basic solution in the reactor core below 8.5.

16. The method of claim 14, wherein the optimizing hydrogen production comprises maintaining the pH value of the basic solution in the oxidizer reactor below 11.

17. The method of claim 14, wherein the optimizing hydrogen production comprises optimizing an amount of the hydrogen generating catalyst.

18. The method of claim 14, wherein optimizing the amount of the hydrogen generating catalyst comprises increasing a regeneration rate of the hydrogen generating catalyst.

19. The method of claim 14, wherein the regeneration rate of the hydrogen generating catalyst comprises a rate of converting a reacted hydrogen generating catalyst back to the hydrogen generating catalyst.

20. The method of claim 14, wherein optimizing the hydrogen production comprises optimizing a regeneration rate of an $Ag^0$.

21. The method of claim 14, wherein optimizing the hydrogen production comprises optimizing an amount of an $Ag_0$, an $Ag^{1+}$, or a combination thereof.

22. The method of claim 14, wherein optimizing the hydrogen production comprises increasing the rate of dissociating oxygen from the silver complex within the oxidizer reactor.

23. The method of claim 14, wherein optimizing the hydrogen production comprises converting a hydroxide of a hydroxide containing compound into an oxide of a metal oxide.

24. The method of claim 14, wherein optimizing the hydrogen production comprises increasing the rate of dissociating a hydroxide from the copper complex.

25. The method of claim 14, wherein regenerating the silver complex by thermolysis comprises optimizing a heat providing duration, a heat providing amount, or a combination thereof through the heat providing device.

26. The method of claim 14, wherein optimizing the hydrogen production comprises optimizing a voltage providing amount, a current providing amount, or a combination thereof through an electric energy providing device.

\* \* \* \* \*